(12) United States Patent
Khanarian et al.

(10) Patent No.: US 6,967,222 B2
(45) Date of Patent: Nov. 22, 2005

(54) POROUS OPTICAL MATERIALS

(75) Inventors: Garo Khanarian, Princeton, NJ (US); Yujian You, Lansdale, PA (US); Robert H. Gore, Southampton, PA (US); Angelo A. Lamola, Worcester, PA (US)

(73) Assignee: Shipley Company, L.L.C., Marlborough, MA (US)

( * ) Notice: Subject to any disclaimer, the term of this patent is extended or adjusted under 35 U.S.C. 154(b) by 226 days.

(21) Appl. No.: 10/154,999

(22) Filed: May 24, 2002

(65) Prior Publication Data

US 2003/0008244 A1 Jan. 9, 2003

Related U.S. Application Data

(60) Provisional application No. 60/293,631, filed on May 25, 2001.

(51) Int. Cl.$^7$ .................................................. C08J 9/26
(52) U.S. Cl. ............................................ 521/77; 521/61
(58) Field of Search ......................................... 521/77, 61

(56) References Cited

U.S. PATENT DOCUMENTS

| | | | |
|---|---|---|---|
| 5,700,844 A | 12/1997 | Hedrick et al. | |
| 5,776,990 A | 7/1998 | Hedrick et al. | |
| 5,837,421 A | 11/1998 | Kanda et al. | |
| 5,895,263 A | 4/1999 | Carter et al. | |
| 5,976,405 A | 11/1999 | Clikeman et al. | |
| 6,087,064 A | 7/2000 | Lin et al. | |
| 6,093,636 A | 7/2000 | Carter et al. | |
| 6,107,357 A | 8/2000 | Hawker et al. | |
| 6,162,838 A | 12/2000 | Kohl | |
| 6,177,360 B1 | 1/2001 | Carter et al. | |
| 6,271,273 B1 | 8/2001 | You et al. | |
| 6,660,176 B2 * | 12/2003 | Tepper et al. | 216/56 |
| 2002/0102312 A1 * | 8/2002 | Tepper et al. | 424/490 |

FOREIGN PATENT DOCUMENTS

EP        1 088 848 A1    4/2001
WO        WO 97/35905     10/1997
WO        WO 00/31183     6/2000
WO        WO 00/61834     10/2000

OTHER PUBLICATIONS

Diener et al., "Dichroic Bragg Reflectors Based on Birefringent Porous Silicon", Appl. Phys. Lett., vol. 78, No. 24, Jun. 11, 2001, pp. 3887–3889.

Doshi et al., "Optically Defined Multifunctional Patterning of Photosensitive Thin–Film Silica Mesophases", Science, vol. 290, Oct. 6, 2000, pp. 107–111.

Ferrand et al., "Optical Losses in Porous Silicon Waveguides in the Near–Infrared: Effects of Scattering", Appl. Phys. Lett., vol. 77, No. 22, Nov. 27, 2000, pp. 3535–3537.

Jain et al., "Porous Silica Materials as Low–K Dielectrics for Electronic and Optical Interconnects", Thin Solid Films, 398: 513–522, Nov. 1, 2001.

Ribeiro et al., "Low Optical Loss Planar Waveguides Prepared in an Organic–Inorganic Hybrid System", Appl. Phys. Lett., vol. 77, No. 22, Nov. 27, 2000, pp. 3502–3504.

Rossi et al., "High Quality Porous–Silicon Buried Waveguides", Appl. Phys. Lett., vol. 78, No. 20, May 14, 2001.

Walheim et al., "Nanophase–Separated Polymer Films as High–Performance Antireflection Coatings", Science, vol. 283, Jan. 22, 1999, pp. 520–522.

Patent Abstracts of Japan; vol. 1994, No. 02, Mar. 31, 1995 & JP 06 308466 A (NEC Corp).

Patent Abstracts of Japan; vol. 017, No. 600 (P–1637), Nov. 4, 1993 & JP 05 181002 A (Nippon Sheet Glass Co. Ltd.), Jul. 23, 1993.

Patent Abstracts of Japan; vol. 018, No. 194 (P–1722), Apr. 5, 1994 & JP 06 003501 A (DaiNippon Printing Co. Ltd), Jan. 14, 1994.

* cited by examiner

Primary Examiner—Irina S. Zemel
(74) Attorney, Agent, or Firm—S. Matthew Cairns

(57) ABSTRACT

Methods of preparing porous optical materials are provided. These methods allow for the selection of the desired pore size and level of porosity in the porous optical material. Such methods utilize a preformed polymeric porogen.

19 Claims, No Drawings

POROUS OPTICAL MATERIALS

This application claims the benefit of U.S. Provisional Application No. 60/293,631 May 25, 2001.

BACKGROUND OF THE INVENTION

The present invention relates generally to the field of materials having a low index of refraction. In particular, the present invention relates to materials suitable for use in the field of optoelectronics.

The index of refraction ("n") is a fundamental property of optical materials. It determines the speed of light in a material ("v") given by the relation $$v=c/n$$

where "c" is the speed of light in a vacuum. The index of refraction results from distortion of the electronic cloud of atoms or molecules in an electric field at optical frequencies. Its value is determined by the density of electrons per unit volume, also known as the volume polarizability. The index of refraction can change with wavelength of light, which is referred to as the dispersion of the refractive index. Additionally, the index of refraction can vary within a material. For instance, the index of refraction can be different along different directions of a material, referred to as birefringence. The index of refraction can also change with the intensity of optical radiation, resulting in many optical effects such as optical Kerr effect, four wave mixing and frequency doubling, as well as many other nonlinear optical effects.

The index of refraction of a material has both a real, i.e. non-absorbing, and an imaginary, i.e. absorbing, component. The relative contribution of each component to the index of refraction of a material depends upon the degree of absorption of the material. As the incident optical radiation approaches the absorption band of the material it is passing through, it is possible to effect electronic transitions. This can result in absorption, luminescence, and non linear optical effects such as light amplification and two photon absorption. Many optical devices, such as waveguides, lenses, gratings, electro-optical modulators and frequency doublers, and the like, utilize the real component of the refractive index.

Many devices utilize the spatial variation of refractive index to control and manipulate light to perform useful functions. For example, an optical waveguide transports light along a predefined path which consists of a guiding region or core surrounded by a cladding which has a lower index of refraction than the core. The waveguide properties are determined by the difference in the refractive indices of the core and cladding, as well as the dimensions of the waveguide. Typical differences in the indices of refraction ("Δn") are from 0.001 to 0.01.

A conventional waveguide cannot be bent more than a limited number of degrees as light will radiate from it rather than travel around such bends. As a result, current photonic devices have to be of dimensions that accommodate varying "S-shaped" bends. Such designs are the result of the relatively small Δn that is available in conventional optical waveguides.

With the increased use of light to transmit data, there is a desire to use waveguides on printed wiring boards. However, the limited ability to bend such waveguides means that only straight waveguides are used or else much of the printed wiring board area is lost to the large bends required by conventional waveguide materials. The trend to increasing the density of components of printed wiring boards is inconsistent with the required large waveguide bends of conventional waveguides. To increase the density of optical integrated circuits on printed wiring boards and in photonic component applications, there is a need for optical waveguides that can support such small bend radii.

Another device for changing the path of light is a Bragg grating, which is a grating consisting of periodic regions of high and low refractive indices. Such gratings transmit or reflect a narrow band of radiation and can act as mirrors or narrow band filters. When the ratio of the indices of the high to low index regions exceeds a certain value it is possible to form photonic band gap structures which reflect radiation at all angles and polarizations.

Bragg gratings have many uses for optical communication systems, such as DWDM, pulse shaping, add-drop switches and the like. The index difference obtained in typical optical fiber Bragg gratings is about 0.001, obtained by UV radiation of photosensitized glass. Thin film filters for DWDM applications use inorganic materials with larger index differences, for example $SiO_2$ (n=1.46) and $TiO_2$ (n=2.7), which are applied by chemical vapor deposition. These gratings can also be used as antireflection coatings for lenses or photoresists used in high resolution lithography. A problem with Bragg gratings is that they can cause distortion of pulses due to the periodic high and low refractive index structure and due to the dispersion of the index of refraction of the materials. There is, therefore, a need for Bragg gratings that are fabricated from lower dispersion materials.

It is possible to fold periodic layers into a cylinder to form a light pipe with a periodically varying index wall. The guide, or center of the pipe, itself can be filled with air or a liquid or solid material. An air filled guide surrounded by an all dielectric mirror is advantageous as an optical pulse is not distorted due to dispersion of refractive index, as occurs in a normal glass waveguide. It is also possible to bend the light path with very small bend radii. However, it is difficult to obtain compatible materials having very low indices of refraction ("$n_L$") and very high indices of refraction ("$n_H$"), in order to obtain the required large ratios of $n_H/n_L$. There is a need for ultralow and very high refractive index materials to realize photonic band gap devices.

Light can also be bent by way of gray scale variations of refractive index. Such gray scale variation of index allows light to be bent in unusual ways, for example in diffractive optical elements or rugate filters. Switchable gratings may also be produced from such gray scale variations. For example a polymer dispersed liquid crystal ("PDLC") medium consists of liquid crystal microdroplets which orient in an electric field and effect a change in refractive index. Such a holographic PDLC medium can be used as tunable mirror, an add-drop multiplexer, and the like.

Certain porous materials are known for optical applications. For example, Rossi et al., *High-quality Porous-Silicon Buried Waveguides, Applied Physics Letters*, vol. 78, no. 20, pp 3003–3005, May 14, 2001, disclose waveguides having both a porous core and cladding material. The porous nature of such silicon waveguide material is formed by applying a certain current density for a set period of time. The pore sizes and pore distribution in such materials is not easily controlled using such process. It would be desirable to prepare such porous materials where the pore size and pore distribution can be precisely controlled. In this way, it would be possible to control or tailor the index of refraction of the resulting porous optical material.

It is clear from the above that there is a need for new optical materials to enable new devices and to improve the performance of current materials.

SUMMARY OF THE INVENTION

It has been surprisingly found that optical materials having ultralow refractive indices are obtained by providing a very high loading of very small pores in such materials. Such materials surprisingly scatter very little light. The present porous optical materials can be prepared by methods that control the resulting pore size and pore size distribution.

The present invention provides a method of preparing a porous optical device including the steps of: a) combining a plurality of porogen particles and a B-staged optical material; b) at least partially curing the B-staged optical material; c) at least partially removing the plurality of porogen particles; and d) defining a path for transmitting light through the optical material. Preferably, such porogen particles are cross-linked. It is further preferred that the plurality of porogen particles has a mean particle size of $\leq 10$ nm.

Also provided by the present invention is a method of manufacturing an electronic device including porous optical device wherein the porous optical device is prepared as described above. Preferred electronic devices are printed wiring boards and integrated circuits.

The present invention further provides a waveguide having a bend radius of the range $\geq 1$ µm. Suitable bend radii of the present waveguides are in the range of $\geq 1$ µm to $\leq 3000$ µm and preferably from $\geq 10$ µm to $\leq 100$ µm. Printed wiring boards containing a waveguide having a bend radius of $\geq 10$ µm are also prepared.

DETAILED DESCRIPTION OF THE INVENTION

As used throughout this specification, the following abbreviations shall have the following meanings, unless the context clearly indicates otherwise: ° C.=degrees centigrade; µm=micron; UV=ultraviolet; nm=nanometer and wt %=weight percent.

The term "(meth)acrylic" includes both acrylic and methacrylic and the term "(meth)acrylate" includes both acrylate and methacrylate. "Alkyl" includes straight chain, branched and cyclic alkyl groups. The term "porogen" refers to a pore forming material, that is a polymeric material or particle dispersed in an optical material and that is subsequently removed to yield pores, voids or free volume in the dielectric material. Thus, the terms "removable porogen," "removable polymer" and "removable particle" are used interchangeably throughout this specification. "Pore" refers to a vacuum or gas-filled volume element within a solid material. Such pores may have a variety of shapes. The terms "pore," "void" and "free volume" are used interchangeably throughout this specification. "Cross-linker" and "cross-linking agent" are used interchangeably throughout this specification. "Polymer" refers to polymers and oligomers and includes homopolymers and copolymers. The terms "oligomer" and "oligomeric" refer to dimers, trimers, tetramers and the like. "Monomer" refers to any ethylenically or acetylenically unsaturated compound capable of being polymerized. Such monomers may contain one or more double or triple bonds. The terms "halogen" and "halo" include fluorine, chlorine, bromine, and iodine. Thus the term "halogenated" refers to fluorinated, chlorinated, brominated, and iodinated. "Fluoroalkyl" refers to both partially fluorinated and perfluorinated alkyl.

The term "B-staged" refers to uncured materials. By "uncured" is meant any material that can be polymerized or cured, such as by condensation, to form higher molecular weight materials, such as coatings or films. Such B-staged material may be monomeric, oligomeric or mixtures thereof. B-staged material is further intended to include mixtures of polymeric material with monomers, oligomers or a mixture of monomers and oligomers.

"Optical matrix material" or "optical material" refers to a material that is optically transparent at the wavelength of use. As used herein, "optical device" is an optical matrix material that has a defined path for transmitting light. A waveguide is an example of an optical device.

All amounts are percent by weight and all ratios are by weight, unless otherwise noted. All numerical ranges are inclusive and combinable in any order, except where it is obvious that such numerical ranges are constrained to add up to 100%.

The present invention provides a method of preparing porous optical devices including the steps of: a) combing a plurality of porogen particles and a B-staged optical material; b) at least partially curing the B-staged optical material to form an optical matrix material; c) at least partially removing the plurality of porogen particles to form a porous optical matrix material; and d) defining a path for transmitting light through the porous optical matrix material. The porous optical devices so produced have an optical material having a region having a plurality of pores. The region of the optical material having a plurality of pores is referred to as the "porous region." Such optical materials may have more than one porous region.

A wide variety of optical devices may be prepared according to the present invention. Suitable optical devices include, but are not limited to, waveguides, Bragg gratings, photonic band gap structures, antireflective coatings such as for lenses, and the like. Suitable optical waveguides include, but are not limited to, splitters, couplers, spectral filters, polarizers, isolators, wavelength division multiplexing structures, and the like. Such waveguides may also contain active functionality, such as amplification and switching such as with electro-optic, thermo-optic or acousto-optic devices. To be useful as amplifiers, the present waveguides typically contain one or more dopants. Erbium is an exemplary dopant. Such dopants are well known in the art.

Waveguides contain one or more core materials surrounded by one or more cladding materials. Either the core material, the cladding material or both may contain one or more porous regions. Typically, the cladding material has a lower index of refraction than the core material. Such differences in the indices of refraction can be achieved by making the cladding with a higher level of porosity than the core material. The core material may be porous or nonporous. In general, the difference in the indices of refraction ("Δn") between the core material and the cladding material is typically $\geq 0.001$, preferably $\geq 0.002$, and more preferably $\geq 0.005$. For optical devices, such as waveguides, having tight bends (i.e., small bend radii of fractions of millimeters), the difference in the indices of refraction is typically $\geq 0.05$, preferably $\geq 0.1$ and more preferably $\geq 0.2$. For very tight bends, such as bend radii of $\geq 1$ µm, it is preferred that the difference in the indices of refraction between the core and cladding materials is $\geq 0.4$. Such bend radii are tighter than those possible with conventional polymer waveguides. Thus, the present invention also provides a waveguide having a bend radius of $\geq 1$ µm and preferably $\geq 10$ µm. Such waveguides typically have a bend radius in the range of $\geq 1$ µm to $\leq 3000$ µm and preferably in the range of $\geq 10$ to 100 µm.

A wide variety of materials may suitably be used as the present optical materials. The selection of the optical material depends upon the intended optical device and the wavelength(s) of light to be transmitted through the device. When the optical device includes both a core and a cladding, the core and cladding materials may be chosen such that there is already a difference in refractive index between the materials, or else the refractive index difference can be imparted by the processing conditions used or the refractive index difference can be imparted by the use of the pores, or any combination thereof. Thus, the core and cladding materials may have the same chemical compositions with the difference in refractive index being imparted by porosity in one or both the core or cladding material.

Suitable optical materials include, but are not limited to, organic polymers, such as thermoplastic materials and cross-linked polymers, organo-inorganic polymers, inorganic polymers such as low-melting inorganic glasses, and the like. Suitable organic polymers include, but are not limited to, poly(meth)acrylate polymers, bicyclobutenes, polycarbonates, polyarylene ethers, polyesters, epoxies, polyurethanes, poly(cyclic olefins), polyimides, and the like, as well as mixtures thereof. Particularly suitable organic polymers include any of the foregoing substituted with fluorine, deuterium or both. Suitable organo-inorganic polymers include, but are not limited to, organo polysilica resins, and the like. Suitable organo polysilica (or organo siloxane) resins include compounds including silicon, carbon, oxygen and hydrogen atoms wherein at least a portion of the carbon atoms are attached to silicon atoms.

In one embodiment, organo polysilica resins are hydrolyzates or partial condensates of one or more silanes of formulae (I) or (II):

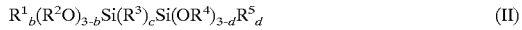

wherein R is hydrogen, $(C_1-C_{24})$alkyl, aryl, and substituted aryl; Y is any hydrolyzable group; a is an integer of 0 to 2; $R^1$, $R^2$, $R^4$ and $R^5$ are independently selected from hydrogen, $(C_1-C_{24})$alkyl, aryl, and substituted aryl; $R^3$ is selected from $(C_1-C_{18})$alkyl, —$(CH_2)_h$—, —$(CH_2)_{h1}$-$E_k$-$(CH_2)_{h2}$—, —$(CH_2)_h$-Z, arylene, substituted arylene, and arylene ether; E is selected from oxygen, $NR^6$ and Z; Z is selected from aryl and substituted aryl; $R^6$ is selected from hydrogen, $(C_1-C_8)$alkyl, aryl and substituted aryl; b and d are each an integer of 0 to 2; c is an integer of 0 to 6; and h, h1, h2 and k are independently an integer from 1 to 6; provided that at least one of R, $R^1$, $R^3$ and $R^5$ is not hydrogen. "Substituted aryl" and "substituted arylene" refer to an aryl or arylene group having one or more of its hydrogens replaced by another substituent group, such as cyano, hydroxy, mercapto, halo, $(C_1-C_6)$alkyl, $(C_1-C_6)$alkoxy, and the like.

It is preferred that R is $(C_1-C_8)$alkyl or phenyl, and more preferably methyl, ethyl, iso-butyl, tert-butyl or phenyl. Preferably, a is 1. Suitable hydrolyzable groups for Y include, but are not limited to, halo, $(C_1-C_6)$alkoxy, acyloxy and the like, and preferably are chloro and $C_1-C_2$)alkoxy. Suitable organosilanes of formula (I) include, but are not limited to, methyl trimethoxysilane, methyl triethoxysilane, phenyl trimethoxysilane, phenyl triethoxysilane, tolyl trimethoxysilane, tolyl triethoxysilane, propyl tripropoxysilane, iso-propyl triethoxysilane, iso-propyl tripropoxysilane, ethyl trimethoxysilane, ethyl triethoxysilane, iso-butyl triethoxysilane, iso-butyl trimethoxysilane, tert-butyl triethoxysilane, tert-butyl trimethoxysilane, cyclohexyl trimethoxysilane and cyclohexyl triethoxysilane.

Organosilanes of formula (II) preferably include those wherein $R^1$ and $R^5$ are independently $(C_1-C_4)$alkyl or phenyl. Preferably $R^1$ and $R^5$ are methyl, ethyl, tert-butyl, iso-butyl and phenyl. It is also preferred that b and d are independently 1 or 2. Preferably $R^3$ is $(C_1-C_{10})$alkyl, —$(CH_2)_h$—, arylene, arylene ether and —$(CH_2)_{h1}$-E-$(CH_2)_{h2}$. Suitable compounds of formula (II) include, but are not limited to, those wherein $R^3$ is methylene, ethylene, propylene, butylene, hexylene, norbornylene, cycloheylene, phenylene, phenylene ether, naphthylene and —$CH_2$—$C_6H_4$—$CH_2$—. It is further preferred that c is 1 to 4.

Suitable organosilanes of formula (II) include, but are not limited to, bis(hexamethoxysilyl)methane, bis(hexaethoxysilyl)methane, bis(hexaphenoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, bis(ethoxydiphenylsilyl)methane, bis(hexamethoxysilyl)ethane, bis(hexaethoxysilyl)ethane, bis(hexaphenoxysilyl)ethane, bis(dimethoxymethylsilyl)ethane, bis(diethoxymethylsilyl)ethane, bis(dimethoxyphenylsilyl)ethane, bis(diethoxyphenylsilyl)ethane, bis(methoxydimethylsilyl)ethane, bis(ethoxydimethylsilyl)ethane, bis(methoxydiphenylsilyl)ethane, bis(ethoxydiphenylsilyl)ethane, 1,3-bis(hexamethoxysilyl))propane, 1,3-bis(hexaethoxysilyl)propane, 1,3-bis(hexaphenoxysilyl)propane, 1,3-bis(dimethoxymethylsilyl)propane, 1,3-bis(diethoxymethylsilyl)propane, 1,3-bis(dimethoxyphenylsilyl)propane, 1,3-bis(diethoxyphenylsilyl)propane, 1,3-bis(methoxydimehylsilyl)propane, 1,3-bis(ethoxydimethylsilyl)propane, 1,3-bis(methoxydiphenylsilyl)propane, and 1,3-bis(ethoxydiphenylsilyl)propane. Preferred of these are hexamethoxydisilane, hexaethoxydisilane, hexaphenoxydisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, 1,2-diethoxy-1,1,2,2-tetraphenyldisilane, bis(hexamethoxysilyl)methane, bis(hexaethoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, and bis(ethoxydiphenylsilyl)methane.

When the B-staged organo polysilica resins comprise a hydrolyzate or partial condensate of organosilanes of formula (II), c may be 0, provided that at least one of $R^1$ and $R^5$ are not hydrogen. In an alternate embodiment, the B-staged organo polysilica resins may comprise a cohydrolyzate or partial cocondensate of organosilanes of both formulae (I) and (II). In such cohydrolyzates or partial cocondensates, c in formula (II) can be 0, provided that at least one of R, $R^1$ and $R^5$ is not hydrogen. Suitable silanes of formula (II) where c is 0 include, but are not limited to, hexamethoxydisilane, hexaethoxydisilane, hexaphenoxydisilane, 1,1,1,2,2-pentamethoxy-2-methyldisilane, 1,1,1,2,2-pentaethoxy-2-methyldisilane, 1,1,1,2,2-pentamethoxy-2-phenyldisilane, 1,1,1,2,2-pentaethoxy-2-phenyldisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,1,2-trimethoxy-1,2,2-trimethyldisilane, 1,1,2-triethoxy-1,2,2-trimethyldisilane, 1,1,2-trimethoxy-1,2,2-triphenyldisilane, 1,1,2-triethoxy-1,2,2-triphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, and 1,2-diethoxy-1,1,2,2-tetraphenyldisilane.

It will be appreciated that prior to any curing step, the B-staged organo polysilica resins may include one or more of hydroxyl or alkoxy end capping or side chain functional groups. Such end capping or side chain functional groups are known to those skilled in the art.

In one embodiment, particularly suitable B-staged organo polysilica resins are hydrolyzates or partial condensates of compounds of formula (I). Such B-staged organo polysilica resins have the formula (III):

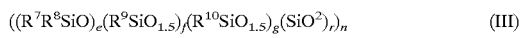

$$((R^7R^8SiO)_e(R^9SiO_{1.5})_f(R^{10}SiO_{1.5})_g(SiO^2)_r)_n \qquad (III)$$

wherein $R^7$, $R^8$, $R^9$ and $R^{10}$ are independently selected from hydrogen, $(C_1-C_{24})$alkyl, aryl, and substituted aryl; e, g and r are independently a number from 0 to 1; f is a number from 0.2 to 1; n is integer from about 3 to about 10,000; provided that e+f+g+r=1; and provided that at least one of $R^7$, $R^8$ and $R^9$ is not hydrogen. Preferred alkyls for any of $R^7$, $R^8$, $R^9$ and $R^{10}$ are $(C_1-C_6)$alkyls. In the above formula (III), e, f, g and r represent the mole ratios of each component. Such mole ratios can be varied between 0 and about 1. It is preferred that e is from 0 to about 0.8. It is also preferred that g is from 0 to about 0.8. It is further preferred that r is from 0 to about 0.8. In the above formula, n refers to the number of repeat units in the B-staged material. Preferably, n is an integer from about 3 to about 1000.

Exemplary organo polysilica resins include, but are not limited to, silsesquioxanes, partially condensed halosilanes or alkoxysilanes such as partially condensed by controlled hydrolysis tetraethoxysilane having number average molecular weight of about 500 to about 20,000, organically modified silicates having the composition $RSiO_3$, $O_3SiRSiO_3$, $R_2SiO_2$ and $O_2SiR_3SiO_2$ wherein R is an organic substituent, and partially condensed orthosilicates having $Si(OR)_4$ as the monomer unit. Silsesquioxanes are polymeric silicate materials of the type $RSiO_{1.5}$ where R is an organic substituent. Suitable silsesquioxanes are alkyl silsesquioxanes such as methyl silsesquioxane, ethyl silsesquioxane, propyl silsesquioxane, butyl silsesquioxane and the like; aryl silsesquioxanes such as phenyl silsesquioxane and tolyl silsesquioxane; alkyl/aryl silsesquioxane mixtures such as a mixture of methyl silsesquioxane and phenyl silsesquioxane; and mixtures of alkyl silsesquioxanes such as methyl silsesquioxane and ethyl silsesquioxane. B-staged silsesquioxane materials include homopolymers of silsesquioxanes, copolymers of silsesquioxanes or mixtures thereof. Such materials are generally commercially available or may be prepared by known methods.

It is preferred that the B-staged organo polysilica resin comprises a silsesquioxane, and more preferably methyl silsesquioxane, ethyl silsesquioxane, propyl silsesquioxane, iso-butyl silsesquioxane, tert-butyl silsesquioxane, phenyl silsesquioxane, tolyl silsesquioxane, benzyl silsesquioxane or mixtures thereof. Methyl silsesquioxane, phenyl silsesquioxane and mixtures thereof are particularly suitable. Other useful silsesquioxane mixtures include mixtures of hydrido silsesquioxanes with alkyl, aryl or alkyl/aryl silsesquioxanes. Typically, the silsesquioxanes useful in the present invention are used as oligomeric materials, generally having from about 3 to about 10,000 repeating units.

Particularly suitable organo polysilica B-staged resins are cohydrolyzates or partial condensates of one or more organosilanes of formulae (I) and/or (II) and one or more tetrafunctional silanes having the formula $SiY_4$, where Y is any hydrolyzable group as defined above. Suitable hydrolyzable groups include, but are not limited to, halo, $(C_1-C_6)$alkoxy, acyloxy and the like. Preferred hydrolyzable groups are chloro and $(C_1-C_2)$alkoxy. Suitable tetrafunctional silanes of the formula $SiY_4$ include, but are not limited to, tetramethoxysilane, tetraethoxysilane, tetrachlorosilane, and the like. Particularly suitable silane mixtures for preparing the cohydrolyzates or partial cocondensates include: methyl triethoxysilane and tetramethoxysilane; methyl trimethoxysilane and tetramethoxysilane; phenyl triethoxysilane and tetraethoxysilane; methyl triethoxysilane and phenyl triethoxysilane and tetraethoxysilane; ethyl triethoxysilane and tetramethoxysilane; and ethyl triethoxysilane and tetraethoxysilane. The ratio of such organosilanes to tetrafunctional silanes is typically from 99:1 to 1:99, preferably from 95:5 to 5:95, more preferably from 90:10 to 10:90, and still more preferably from 80:20 to 20:80.

In a particular embodiment, the B-staged organo polysilica resin is a cohydrolyzate or partial cocondensate of one or more organosilanes of formula (I) and a tetrafunctional silane of formula $SiY_4$. In another embodiment, the B-staged organo polysilica resin is a cohydrolyzate or partial cocondensate of one or more organosilanes of formula (II) and a tetrafunctional silane of formula $SiY_4$. In still another embodiment, the B-staged organo polysilica resin is a cohydrolyzate or partial cocondensate of one or more organosilanes of formula (I), one or more silanes of formula (II) and a tetrafunctional silane of formula $SiY_4$. The B-staged organo polysilica resins of the present invention include a non-hydrolyzed or non-condensed silane of one or more silanes of formulae (I) or (II) with the hydrolayzate or partial condensate of one or more silanes of formulae (I) or (II). In a further embodiement, the B-staged organo polysilica resin comprises a silane of formula (II) and a hydrolyzate of partial condensate of one or more organosilanes of formula (I), and preferably a co-hydrolyzate or partial cocondensate of one or more organosilanes of formula (I) with a tetrafunctional silane of the formula $SiY_4$ where Y is as defined above. Perferably, such B-staged organo polysilica resin comprises a mixture of one or more silanes of formula (II) and a cohydrolyzate or partial cocondensate having the formula $(RSiO_{1.5})$ $(SiO_2)$ where R is as defined above.

When organosilanes of formula (I) are cohydrolyzed or cocondensed with a tetrafunctional silane, it is preferred that the organosilane of formula (I) has the formula $RSiY_3$, and preferably is selected from methyl trimethoxysilane, methyl triethoxysilane, ethyl trimethoxysilane, ethyl triethoxysilane, phenyl trimethoxysilane, phenyl triethoxysilane and mixtures thereof. It is also preferred that the tetrafunctional silane is selected from tetramethoxysilane and tetraethoxysilane.

In an alternative embodiment, the optical materials, particularly the organo polysilica resins such as silsesquioxanes, may be photoimageable or photodefinable. Such photoimageable or photodefinable compositions are particularly suitable for the step of defining a path for transmitting light in the optical material, as described more fully below. Suitable photoimageable or photodefinable compositions contain a an optical material capable of undergoing cross-linking reactions, a photoactive component and optionally a cross-linking agent for the optical material. Such cross-linking agent is preferably organic.

Particularly useful photoimageable or photodefinable organo polysilica resins are those containing one or more hydroxyl groups capable of undergoing cross-linking reactions. Such photodefinable compositions are negative acting. Suitable photoimageable or photodefinable silsesquioxanes include a polymer blend having 30 to 90 wt % of a silsesquioxane polymer of the formula $(R^4SiO_{1.5})_{m1}$—$(R^5SiO_{1.5})_{m2}$, wherein m1 and m2 are greater than zero, $R^4$ is hydroxyphenylalkyl having at least 2 carbon atoms in the alkyl moiety, and $R^5$ is selected form the group consisting of alkyl, cycloalkyl, and aryl; and 70 to 10 wt % of a non-silsesquioxane polymer, as disclosed in U.S. Pat. No. 6,087,064 (Lin et al.). Other suitable photodefinable compositions include a silsesquioxane oligomer including as polymerized units a monomer of the formula $(R^6SiO_{1.5})$ wherein $R^6$ is selected from hydroxyphenyl or hydroxybenzyl and is preferably hydroxybenzyl; and a photoactive component, wherein the solubility of the silsesquioxane oligomer is altered upon exposure to actinic radiation.

Silsesquioxane oligomers useful in the photoimageable or photodefinable compositions may be a homo-oligomer, i.e. contain only one monomer, or may be a co-oligomer, i.e. contain two or more monomers. Suitable silsesquioxane oligomers contain at least one monomer of the formula $(R^7SiO_{1.5})_{p1}$ wherein $R^7$ is hydroxyphenyl or hydroxybenzyl and p1 is greater than zero and a second monomer of formula $(R^8SiO_{1.5})_{p2}$ wherein $R^8$ is hydroxyphenyl, hydroxyphenyl($C_1$–$C_5$)alkyl, phenyl, halophenyl, ($C_1$–$C_{10}$)alkylphenyl, ($C_1$–$C_{10}$)fluoroalkylphenyl, ($C_1$–$C_{10}$)alkyl or ($C_1$–$C_{10}$)fluoroalkyl, and wherein p2 is greater than zero. Such alkyl or aryl $R^8$ groups may be optionally substituted, as described above. Particularly suitable silsesquioxane oligomers having more than one silsesquioxane monomer include $(R^7SiO_{1.5})_{p1}(R^8SiO_{1.5})_{p2}$, wherein $R^7$, $R^8$, p1 and p2 are as defined above.

In an alternate embodiment, blends of silsesquioxane oligomers may be used. Exemplary blends include, but are not limited to, an oligomer having the formula $(R^7SiO_{1.5})_{p1}$ wherein $R^7$ is hydroxyphenyl or hydroxybenzyl and p1 is greater than zero with one or more other oligomers may be suitably employed. Such other oligomers may be silsesquioxane oligomers, such as those including the formula $(R^8SiO_{1.5})_{p2}$ wherein $R^8$ is hydroxyphenyl, hydroxyphenyl ($C_1$–$C_5$)alkyl, phenyl, halophenyl, ($C_1$–$C_{10}$)alkylphenyl, ($C_1$–$C_{10}$)fluoroalkylphenyl, ($C_1$–$C_{10}$)alkyl or ($C_1$–$C_{10}$) fluoroalkyl, and wherein p2 are greater than zero, or siloxane oligomers, or organic (non-silicon conatining) oligomers.

The hydroxyphenyl and hydroxyphenyl($C_1$–$C_5$)alkyl moieties in the silsesquioxanes useful for photoimageable and/or phodefineable compositions contain at least one hydroxyl group, and may contain two, three or more hydroxy groups. Such hydroxyphenyl and hydroxyphenyl ($C_1$–$C_5$)alkyl moieties may be further substituted. By "substituted hydroxyphenyl" it is meant that one or more of the phenyl hydrogens is replaced by another substituent group. Likewise, by "substituted hydroxyphenyl($C_1$–$C_5$)alkyl" it is meant that one or more hydrogens of the phenyl and/or alkyl group is replaced by another substituent group. Suitable substituent groups include deuterium, halogen, preferably fluorine, ($C_1$–$C_6$)alkyl, ($C_1$–$C_6$)haloalkyl, and the like. In one embodiment, the silsesquioxane oligomers are preferably free of acid containing groups, such as carboxylic acid and sulfonic acid groups. In other embodiments, such acid containing groups may be desirable.

In the above formulae, p1 and p2 are the number of repeat units in the silsesquioxane oligomer. The present silsesquioxane oligomers may contain a wide range of repeat units. Thus, p1 and p2 may vary across a wide range such as from 1 to 100,000. Preferably, p1 and p2 are independently from 1 to 50,000, more preferably from 3 to 10,000, and still more preferably from 3 to 1000. Thus, the silsesquioxane oligomer may vary widely in molecular weight. Particularly suitable molecular weights range from 200 to 100,000 and preferably from 500 to 25,000 and more preferably from 1000 to 20,000.

A wide variety of photoactive components may be used in the photodefinable and/or photoimageable compositions, including, but not limited to, photoacid generators and photobase generators. Photoacid generators are preferred.

Photobase generators useful in the photodefinable compositions are any compounds which liberate base upon exposure to light, typically at a wavelength of about 320 to 420 nanometers, however other wavelengths may be suitable. Suitable photobase generators include, but are not limited to: benzyl carbamates, benzoin carbamates, O-carbamoylhydroxyamines, O-carbamoyloximes, aromatic sulfonamides, alpha-lactams, N-(2-allylethenyl)amides, arylazide compounds, N-arylformamides, and 4-(ortho-nitrophenyl)dihydropyridines.

The photoacid generators are any compounds which liberate acid upon exposure to light, typically at a wavelength of about 320 to 420 nanometers, however other wavelengths may be suitable. Suitable photoacid generators include, but are not limited to, halogenated triazines, onium salts, and sulfonated esters.

The amount of photoactive component is any amount sufficient to catalyze cross-linking of the optical material, which may be B-staged or cured. The photoactive components are typically used in the range of 0.1 to 25% by weight, based on the weight of the composition. It is preferred that the photoactive component is present in an amount in the range of 0.1 to 15% by weight, more preferably in the range of 0.1 to 12% by weight, and still more preferably less than or equal to 5% by weight. A particularly suitable range is from 0.1 to 5% by weight.

Any aromatic or aliphatic cross-linking agent that reacts with the optical material, particularly a silsesquioxane oligomer, is suitable for use in the present invention. Such organic cross-linking agents will cure to form a polymerized network with the optical material, and reduce solubility in selected solvents. Such organic cross-linking agents may be monomers or polymers. It will be appreciated by those skilled in the art that combinations of cross-linking agents may be used successfully in the present invention.

Suitable organic cross-linking agents include, but are not limited to: amine containing compounds, epoxy containing materials, compounds containing at least two vinyl ether groups, allyl substituted aromatic compounds, and combinations thereof. Preferred cross-linking agents include amine containing compounds and epoxy containing materials.

The amine containing cross-linking agents include, but are not limited to: a melamine monomers, melamine polymers, alkylolmethyl melamines, benzoguanamine resins, benzoguanamine-formaldehyde resins, urea-formaldehyde resins, glycoluril-formaldehyde resins, and combinations thereof. These resins may be prepared by the reaction of acrylamide or methacrylamide copolymers with formaldehyde in an alcohol-containing solution, or alternatively by the copolymerization of N-alkoxymethylacrylamide or methacrylamide with other suitable monomers. Particularly suitable amine-based crosslinkers include the melamines manufactured by Cytec of West Paterson, N.J., such as CYMEL™ 300, 301, 303, 350, 370, 380, 1116 and 1130; benzoguanamine resins such as CYMEL™ 1123 and 1125; the glycoluril resins CYMEL™

1170, 1171 and 1172; and the urea-based resins BEETLE™ 60, 65 and 80, also available from Cytec, West Paterson, N.J. A large number of similar amine-based compounds are commercially available from various suppliers.

Melamines are the preferred amine-based cross-linkers. Particularly preferred are alkylolmethyl melamine resins. These resins are typically ethers such as trialkylolmethyl melamine and hexaalkylolmethyl melamine. The alkyl group may have from 1 to 8 or more carbon atoms but is preferably methyl. Depending upon the reaction conditions and the concentration of formaldehyde, the methyl ethers may react with each other to form more complex units.

Epoxy containing materials useful as cross-linkers are any organic compounds having one or more oxirane rings that are polymerizable by ring opening. Such materials, broadly called epoxides, include, but are not limited to: monomeric epoxy compounds, and polymeric epoxides that may be aliphatic, cycloaliphatic, aromatic or heterocyclic. Useful epoxy-containing materials may vary from low molecular weight monomeric materials and oligomers to relatively high molecular weight polymers and may vary greatly in the nature of their backbone and substituent groups. For example, the backbone may be of any type and substituent groups may be any group free of any substituents reactive with an oxirane ring at room temperature. Suitable substituents include, but are not limited to: halogens, ester groups, ethers, sulfonate groups, siloxane groups, nitro groups, phosphate groups, and the like.

Particularly suitable organic cross-linking agents include those containing one or more methoxymethyl groups, such as methoxymethyl-substituted melamines and methoxymethyl-substituted glycourils. Hexamethoxymethylmelamine is a preferred methoxymethyl-substituted melamine. It is further preferred that one or more of the hydrogens of the organic cross-linking agent, and more preferably one or more of the methyl hydrogens in the methoxymethyl substituent, is substituted with a halogen, preferably fluorine. Thus, preferred cross-linkers include those containing one or more methoxyfluoromethyl and/or methoxydifluoromethyl substituents. Exemplary preferred fluorinated cross-linking agents include methoxyfluoromethyl- and methoxydifluoromethyl-substituted melamines and glycourils, such as hexamethoxyfluoromethylmelamine and hexamethoxydifluoromethylmelamine. Also suitable are fluorinated epoxy cross-linking agents. For certain applications, it is preferred that the cross-linking agent is fluorinated.

Other additives may optionally be present in such photodefinable optical material compositions and include, but are not limited to: dyes, such as ORASOL BLUE, available from Ciba-Geigy, leveling agents, fillers, pigments, wetting agents, antifoam agents, adhesion promoters, thixotropic agents, fire retardants and the like. Such additives are well known in the art for coating compositions. It will be appreciated that more than one additive may be combined in the compositions of the present invention. For example, a wetting agent may be combined with a thixotropic agent. Suitable fillers and thixotropic agents include silica, fumed silica, talc and the like. Suitable wetting agents include silicon based agents, such as SILWET™, available from Dow. Such optional additives are commercially available from a variety of sources. The amounts of such optional additives to be used in the present compositions are within the ability of those skilled in the art.

The present compositions may optionally contain one or more solvents. Such solvents aid in formulating the present compositions and in coating the present compositions on a substrate. A wide variety of solvents may be used. Suitable solvents include, but are not limited to, glycol ethers, such as ethylene glycol monomethyl ether, propylene glycol monomethyl ether, dipropylene glycol monomethyl ether; esters such as methyl cellosolve acetate, ethyl cellosolve acetate, propylene glycol monomethyl ether acetate, dipropylene glycol monomethyl ether acetate, dibasic esters, carbonates such as propylene carbonate, γ-butyrolactone, esters such as ethyl lactate, n-amyl acetate and n-butyl acetate, alcohols such as n-propanol, iso-propanol, ketones such as cyclohexanone, methyl isobutyl ketone, diisobutyl ketone and 2-heptanone, lactones such as γ-butyrolactone and ε-caprolactone, ethers such as diphenyl ether and anisole, hydrocarbons such as mesitylene, toluene and xylene, and heterocyclic compounds such as N-methyl-2-pyrrolidone, N,N'-dimethylpropyleneurea, or mixtures thereof.

The photodefinable compositions of the present invention may be prepared by combining the B-staged optical material such as a silsesquioxane oligomer, photoactive component, optional solvent, optional one or more cross-linking agents and optional additives in any order.

The optical materials of the present invention are made porous by the incorporation of one or more porogens. Methods of forming porous materials that may be used in the present invention include those disclosed in U.S. Pat. No. 5,895,263 (Carter et al.) and U.S. Pat. No. 6,093,636 (Carter et al.), European Patent App. 1 088 848 (Allen et al.) and PCT Patent App. WO 00/31183 (Bruza et al.).

A wide variety of porogens are suitable for use in the present invention. For example, while solvents may function as porogens, it is difficult to control the resulting pore size and pore size distribution using them. Accordingly, polymers are preferred porogens. The polymers useful as porogens are removable. By "removable" it is meant that the polymer particles depolymerize, degrade or otherwise break down into volatile components which can then diffuse through the host optical material. Suitable polymers include, but are not limited to: cross-linked polymer particles, hyperbranched polymers, block copolymers, linear polymers and the like. Cross-linked polymer particles are preferred. Preferred cross-linked polymer particles are those disclosed in European Patent App. 1 088 848 (Allen et al.) and U.S. Pat. No. 6,271,273 (You et al.). Suitable polymer porogens include poly (olefin sulfones), nitrocellulose polymers and polysilynes.

The cross-linked polymer particles useful as porogens include as polymerized units one or more ethylenically or acetylenically unsaturated monomers and one or more cross-linking agents. Suitable unsaturated monomers include, but are not limited to: (meth)acrylic acid, (meth)acrylamides, alkyl (meth)acrylates, alkenyl (meth)acrylates, aromatic (meth)acrylates, vinyl aromatic monomers, nitrogen-containing compounds and their thio-analogs, cyclic olefin polymers and substituted ethylene monomers. Such monomers may optionally be substituted.

Typically, the alkyl (meth)acrylates are $(C_1-C_{24})$alkyl (meth)acrylates. Suitable alkyl (meth)acrylates include, but are not limited to, methyl methacrylate, methyl acrylate, ethyl acrylate, propyl methacrylate, butyl methacrylate, butyl acrylate, isobutyl methacrylate, hexyl methacrylate, cyclohexyl methacrylate, cyclohexyl acrylate, 2-ethylhexyl acrylate, 2-ethylhexyl methacrylate, octyl methacrylate, decyl methacrylate, isodecyl methacrylate, undecyl methacrylate, dodecyl methacrylate, tridecyl methacrylate, tetradecyl methacrylate, pentadecyl methacrylate and mixtures thereof. The alkyl (meth)acrylate monomers may be a single monomer or a mixture having different numbers of carbon atoms in the alkyl portion.

Suitable optionally substituted (meth)acrylamide and alkyl (meth)acrylate monomers include, but are not limited to: hydroxy($C_2$–$C_6$)alkyl (meth)acrylates, di-($C_1$–$C_{12}$) alkylamino($C_2$–$C_6$)alkyl (meth)acrylates, di-($C_1$–$C_{12}$) alkylamino (meth)acrylates, di-($C_1$–$C_{12}$)alkylamino($C_2$–$C_6$) alkyl (meth)acrylamides, and di-($C_1$–$C_{12}$)alkylamino (meth) acrylamides. Examples of dialkylamino substituted (meth) acrylates and (meth)acrylamides include, but are not limited to: dimethylaminoethyl methacrylate, dimethylaminoethyl acrylate, N,N-dimethylaminoethyl methacrylamide, N,N-dimethyl-aminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri ($C_1$–$C_6$)alkylsilyl (meth)acrylate, γ-propyl di($C_1$–$C_6$)alkoxy ($C_1$–$C_6$)alkylsilyl (meth)acrylate, γ-propyl di($C_1$–$C_6$)alkyl ($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene, α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$) alkylamino derivatives and the like.

The nitrogen-containing compounds and their thio-analogs useful as unsaturated monomers include, but are not limited to: vinylpyridines such as 2-vinylpyridine or 4-vinylpyridine; lower alkyl ($C_1$–$C_8$) substituted N-vinyl pyridines such as 2-methyl-5-vinylpyridine, 2-ethyl-5-vinylpyridine, 3-methyl-5-vinylpyridine, 2,3-dimethyl-5-vinyl-pyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinyl carbazole; N-vinyl-succinimide; (meth)acrylonitrile; o-, m-, or p-aminostyrene; maleimide; N-vinyl-oxazolidone; N,N-dimethyl aminoethyl-vinyl-ether; ethyl-2-cyano acrylate; vinyl acetonitrile; N-vinylphthalimide; N-vinyl-pyrrolidones such as N-vinyl-thio-pyrrolidone, 3 methyl-1-vinylpyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone and 3,4,5-trimethyl-1-vinyl-pyrrolidone; vinyl pyrroles; vinyl anilines; and vinyl piperidines.

A wide variety of cyclic olefin monomers may be used. Exemplary cyclic olefin monomers include, but are not limited to, cyclopentadiene, cyclopentene, cyclohexene, norbornene, norbornadiene, and the like.

The substituted ethylene monomers useful as unsaturated monomers is in the present invention include, but are not limited to: allylic monomers, vinyl acetate, vinyl formamide, vinyl chloride, vinyl fluoride, vinyl bromide, vinylidene chloride, vinylidene fluoride and vinylidene bromide.

Any amount of cross-linker is suitable for use in preparing the cross-linked polymer porogen particles. Typically, the porogens contain at least 1% by weight of cross-linker, based on the weight of the porogen. Up to and including 100% cross-linking agent, based on the weight of the porogen, may be effectively used in the particles of the present invention. It is preferred that the amount of cross-linker is from about 1% to about 80%, and more preferably from about 1% to about 60%. It will be appreciated by those skilled in the art that as the amount of cross-linker in the porogen increases, the conditions for removal of the porogen from the dielectric matrix may change.

Suitable porogen cross-linkers include di-, tri-, tetra-, or higher multi-functional ethylenically unsaturated monomers. Examples of cross-linkers useful in forming the cross-linked porogens include, but are not limited to: trivinylbenzene, divinyltoluene, divinylpyridine, divinyl-naphthalene and divinylxylene; and such as ethyleneglycol diacrylate, trimethylolpropane triacrylate, diethyleneglycol divinyl ether, trivinylcyclohexane, allyl methacrylate, ethyleneglycol dimethacrylate, diethyleneglycol dimethacrylate, propyleneglycol dimethacrylate, propyleneglycol diacrylate, trimethylolpropane trimethacrylate, divinyl benzene, glycidyl methacrylate, 2,2-dimethylpropane 1,3 diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane) and mixtures thereof.

Such cross-linked polymer particles may be prepared by a variety of methods known in the art, such as solution polymerization and emulsion polymerization. Such methods are disclosed in European Patent App. 1 088 848. Typically, the molecular weight of these polymers is in the range of 10,000 to 1,000,000, preferably 20,000 to 500,000, and more preferably 20,000 to 100,000.

In one embodiment, the plurality of cross-linked polymer particles useful in forming the porous structures of the invention typically have a mean particle size of 5 nm or less. In another embodiment, the plurality of particles has a mean particle size of less than or equal to 10 nm. It is preferred that the plurality of particles have a mean particle size in the range of 0.5 to 5 nm. Preferably, the mean particle size is ≦3 nm, and more preferably ≦2 nm. The particle size polydispersity of these materials is in the range of 1 to 20, preferably 1.001 to 15, and more preferably 1.001 to 10. The very small particle sizes of these particles, as well as their fairly narrow polydispersities, are particularly advantageous in preparing the very highly porous optical structures of the invention. It will be appreciated by those skilled in the art that polymer particles having mean particle sizes >5 nm, such as up to 10 nm or greater, may also be used, but are less preferred. One of the advantages of the present invention is that a preformed porogen is used to provide the pores in the optical material. By performing the removable porogen, the particle size of the porogen can be selected to provide the desired pore size in the optical material.

In preparing porous optical devices of the present invention, the porogens described above are first combined with, such as dispersed within or dissolved in, a B-staged optical material. The amount of porogen used will be that amount necessary to provide the desired porosity or free-volume. Porosity is a measure of the volume fraction of pores in that region of the material. If a material has two or more porous regions, the regions may each have a different level of porosity. The higher the level of porosity, the lower the index of refraction. It is preferred that the porous region has a porosity of ≧10%, more preferably ≧20%, and even more preferably ≧30%. A particularly suitable level of porosity is ≧50%. Other useful levels of porosity include, but are not limited to, ≧60%, ≧65%, ≧70%, ≧75%, ≧80%, ≧90% and ≧95%. It will be appreciated that there is an upper limit to the porosity as there must be some optical material remaining to provide structure to the material. Typically, ≧1% of the optical material in the porous region must be present when such material is porous. A suitable range of porosity for the optical material is from ≧10 to 99%, preferably ≧50 to 99%, and more preferably ≧60 to 99%.

With porogen loading levels of ≧50%, the resulting porous optical material typically has an open cell or interconnected pore structure. As the porogen loading levels increase, the resulting wall thickness of the material between the pores decreases. Reduced wall thickness between the pores is advantageous as it reduces the scattering of light. Thus, it is preferred to have a porous material having very thin walls between the pores, typically walls having a thickness of 0.5 to 10 nm. Preferably, the wall thickness is from 0.5 to 5 nm, and more preferably from 1 to 3 nm. Accordingly, the present invention provides an optical device including an optical material having a plurality of pores and having a wall thickness between the pores of 0.5 to 10 nm.

The porogens may be combined with the B-staged optical material by any methods known in the art. Typically, the B-staged optical material is first dissolved in a suitable high boiling solvent, such as methyl isobutyl ketone, diisobutyl ketone, 2-heptanone, γ-butyrolactone, γ-caprolactone, ethyl lactate propyleneglycol monomethyl ether acetate, propyleneglycol monomethyl ether, diphenyl ether, anisole, n-amyl acetate, n-butyl acetate, cyclohexanone, N-methyl-2-pyrrolidone, N,N'-dimethylpropyleneurea, mesitylene, xylenes, or mixtures thereof to form a solution. The porogens are then combined with, e.g. dispersed or dissolved within, the solution. The resulting mixture is then deposited on a substrate by methods known in the art, such as spin coating, spray coating, doctor blading or electrochemical deposition to form a film or layer.

It is preferred that the porogens are compatible with the optical material. By "compatible" is meant that a composition of B-staged optical material and porogen are optically transparent to visible light. It is preferred that a solution of B-staged optical material and porogen, a film or layer including a composition of B-staged optical material and porogen, a composition including an optical material having porogen dispersed therein, and the resulting porous optical material after removal of the porogen are all optically transparent to visible light. By "substantially compatible" is meant that a composition of B-staged optical material resin and porogen is slightly cloudy or slightly opaque. Preferably, "substantially compatible" means at least one of a solution of B-staged optical material resin and porogen, a film or layer including a composition of B-staged optical material resin and porogen, a composition including an optical material resin having porogen dispersed therein, and the resulting porous optical material resin after removal of the porogen is slightly cloudy or slightly opaque.

Preferably, the porogens are dispersible, miscible or otherwise substantially compatible with the host B-staged optical material in solution and in any optical material film. Thus, the porogen must be soluble in the same solvent or mixed solvent system as the host B-staged optical material. Uniformly dispersed pores can be achieved by selecting porogens that are present within this solution as substantially discrete, substantially non-aggregated or substantially non-agglomerated particles. The requirement for non-agglomeration is not necessary when high volumes of porosity (e.g. ≧50%) are desired. In general, the resulting pore in the optical material is substantially the same size (i.e. within 10%) as the particle size of the porogen. However, the pore in the optical material may be more than 10% smaller than the size of the porogen used under certain conditions. In high loadings of porosity, e.g. ≧50%, the pores may be interconnected, in whole or in part, making determination difficult whether the pore has substantially the same pore size as the porogen used.

After being deposited on a substrate, the B-staged optical material is then at least partially cured and preferably substantially cured to form a rigid, cross-linked optical matrix material without substantially removing the porogen. The curing of the optical material may be by any means known in the art including, but not limited to, heating or irradiating to induce condensation or e-beam irradiation to facilitate free radical coupling of the oligomer or monomer units. Such curing conditions are known to those skilled in the art.

Once the B-staged optical material is cured, it is subjected to conditions which at least partially remove the porogen without substantially degrading the optical matrix material, that is, less than 5% by weight of the optical matrix material is lost. Typically, such conditions include, but are not limited to exposure to heat, pressure or radiation, such as, but not limited to, actinic, infrared, microwave, UV, x-ray, gamma ray, alpha particles, neutron beam or electron beam, or exposing the material to chemical means, or any combination thereof. To remove the porogen thermally, the optical matrix material can be heated by oven heating or microwave heating. Under typical thermal removal conditions, the polymerized optical matrix material is heated to about 150° or greater, and preferably from 200° to 300° C. It will be recognized by those skilled in the art that the particular removal temperature of a thermally labile porogen will vary according to composition of the porogen. Upon removal, the porogen polymer depolymerizes or otherwise breaks down into volatile components or fragments which are then removed from, or migrate out of, the optical matrix material yielding pores or voids, which fill up with the carrier gas used in the process. Thus, a porous optical material having voids is obtained.

The porogens can be thermally removed under vacuum, nitrogen, argon, mixtures of nitrogen and hydrogen, such as forming gas, or other inert or reducing atmosphere. The porogens may be removed at any temperature that is higher than the thermal curing temperature and lower than the thermal decomposition temperature of the optical matrix material, and typically within the temperature ranges discussed above. Typically, the porogens are removed upon heating for a period of time in the range of 1 to 120 minutes.

In one embodiment, when a porogen is removed by exposure to radiation, the porogen polymer is typically exposed under an inert atmosphere, such as nitrogen, to a radiation source, such as, but not limited to, visible or ultraviolet light. The energy flux of the radiation must be sufficiently high such that porogen particles are at least partially removed. It will be appreciated by those skilled in the art that a combination of heat and radiation may be used to remove the porogens of the present invention, e.g. when the porogen includes a poly(olefin sulfone). It will also be appreciated by those skilled in the art that other methods of porogen removal, such as by atom abstraction, may be employed. An advantage of using radiation over heat to remove the porogens is that lower processing conditions can be used.

In an alternate embodiment, the porogens can be removed at lower temperatures by combining a photo- or thermal-base or photo- or thermal acid generator with the polymer porogen. Such base or acid generator may be copolymerized with the monomers used to make the porogens. Alternatively, the porogen polymer may be functionalized to add such base or acid generator to the polymer. Another alternative is to use the base or acid generator as a core material in preparing a core-shell polymer. Porogen particles containing such photo- or thermal-base generator are removed from the cured optical matrix material by exposing the material to radiation or heat sufficient to generate the base, followed by contact of the material with an acidic strip solution. Likewise, porogen particles containing such photo- or thermal-acid generator are removed from the cured optical matrix material by exposing the material to radiation or heat sufficient to generate the acid, followed by contact of the material with a basic strip solution.

In a further embodiment, the highly porous structures of the present invention allow for ready removal of the porogens by chemical means. Suitable means include, but are not limited to, washing the porogen containing material with a suitable solvent to dissolve or otherwise wash away the porogen, contacting the porogen containing material with a suitable polymer remover or stripper, and the like. A wide variety of polymer removers or strippers may be used, such as those used in the removal of photoresists, antireflective coatings and/or edge beads in the manufacture of integrated circuits. Suitable polymer removers include those sold by Silicon Valley Chemlabs, Inc., Sunnyvale, Calif., as well as hydroxylamine based strippers sold by EKC Technologies.

In a further alternative embodiment, after removal of the porogen, the pores of the optical material may be filled with a another material such as a gas or a liquid. Such other material may have a higher or lower refractive index as compared to the porous region of the optical material.

The optical material of the present invention may further include one or more non-porous regions, i.e. regions that are free of added pores or free-volume. By "added pores" it is meant pores that are purposely formed, rather than the free-volume or voids inherent in a material due to the natural spacing between adjacent atoms. Optical devices that have optical materials having alternating porous and non-porous regions may be useful in certain applications.

In still a further alternative embodiment, suitable porogens may be selected that do not require removal to achieve the desired properties. Such non-removed porogens are referred to as "polymeric dopants" and may have a higher or lower refractive index as compared to the porous region of the optical material. For example, optical material may be prepared according to the present invention containing any level of polymeric dopant, and preferably from $\geq 50$ to 99% of polymeric dopant. Suitable polymeric dopants are dyes, light emitting polymers, nanotubes, fullerenes, liquid crystals, semiconductor nanoparticles such as quantum dots, non-linear optical ("NLO") polymers, and the like. Typically, when liquid crystals are used, the liquid crystal domains should be $\geq 50$ nm in size. Such materials may be selected to either increase or decrease the refractive index of the material. In waveguide applications, with this approach the difference in the refractive indices of the core and cladding materials can be increased or decreased as desired. For example, semiconductor particles may be selected to increase the refractive index for light amplification applications.

In yet a further embodiment, the polymeric dopants may be prepared as the core material in a core-shell polymer. Suitable core-shell polymer arrangements are those disclosed in U.S. Pat. No. 5,976,405 (Clikeman et al.). Encasing the polymeric dopant in a polymer shell has the advantage of providing a polymer material that may be more compatible with the optical material, and providing the polymeric dopant in a form having a very narrow particle size polydispersity and a controlled particle size.

When the present optical device is a waveguide, the porogens may be added to either the core material or cladding material. The choice of core or cladding depends upon the particular waveguide application. For example, in an optical waveguide, the cladding material has a lower refractive index than the core material. In such cases, the porogens would be added to the cladding material, as the pores resulting from removal of the porogens lower the refractive index of the material. Thus, porous cladding materials have a lower refractive index than corresponding non-porous cladding materials. In other optical devices, such as gratings, a graduated or periodic refractive index is desired in the optical material. In such cases it is desirable to add the porogens to the core material in a way that provides a material having a non-homogeneous refractive index, or, alternatively, to induce such non-homogeneous refractive index during curing of the B-staged optical material.

The optical devices of the present invention provide a path for transmitting light through the porous optical material. Such path may be defined prior to, simultaneously with or after removal of the porogens. The light transmitting path may be defined by any suitable method, such as, but not limited to, lithography, etching, selective curing or by the filling of a predefined cavity or mold with the optical material. Lithography is a preferred method of defining the light transmitting path. Any of the above described photodefinable or photoimageable compositions may suitably be used in such lithographic processes. In such process, the photodefinable or photoimageable composition is exposed to an appropriate wavelength of actinic radiation through a mask. The imaged composition is then developed to provide a path for transmitting light through the optical material. Alternatively, etching such as dry (or ion) etching or wet (chemical) etching may be used to define the light transmitting path. Typically, the optical material is etched through a mask to provide the desired light transmitting path. In yet another alternative, the optical material may be used to fill a preformed cavity, such as a trench or via in the printed wiring board.

Periodic refractive indices in a core material can be achieved by a variety of methods using the present porogens. Suitable methods include, but are not limited to, polymer induced phase separation, gray scale changes in refractive index parallel to the plane of the core material, and the like.

In a polymer induced phase separation ("PIPS") process, a plurality of polymer porogens is dispersed in a B-staged material, such as a B-staged core material. The porogen is selected such that it is more highly soluble in the B-staged phase of the material than in a cured or partially cured matrix material. The curing or polymerization of the B-staged material renders the porogen less soluble and the porogen comes out of solution. If the B-staged material is cured by light or heat along a path, the concentration of porogen will increase by diffusion in the uncured or less cured areas.

For example, a mixture of a photocurable B-staged material and porogen may be disposed on a substrate. The porogen is selected such that it is rendered less soluble in the matrix as the matrix cures. The B-staged material may be exposed to actinic radiation through a gray scale mask. During such exposure, the porogen is rendered less soluble in those regions receiving a greater extent of radiation, i.e. greater extent of curing of the material, than in those regions receiving a lesser extent of radiation, i.e. lesser extent of curing of the material. This results in a migration by diffusion of porogen particles to those lesser cured areas of material. In this way, the concentration of porogen is increased in the areas receiving a lower dose of actinic radiation as compared to those areas receiving a higher dose of radiation. The material is then exposed by flood exposure to actinic radiation to completely cure the material. After complete curing, the porogen is then removed. The areas of greater porogen concentration will have a lower refractive index than those areas having a lower porogen concentration. Thus, areas of graduated refractive indices and/or periodic refractive indices can be prepared.

Another method of affecting the gray scale variation of refractive index is by varying the concentration of porogens in the B-staged material. This can be done by a variety of methods, including the use of ink jet printing methods.

Gray scale changes in refractive index in the plane of the optical waveguide can also be prepared according to the present invention. In this way, the index of refraction of the cladding material can vary along the length of the optical device so that tapered structures can be prepared. This is particularly suitable to the manufacture of tapered waveguides, which can be used to connect an optical fiber with a waveguide on an electronic device, such as a printed circuit board.

The optical devices of the present invention may be used in a variety of electronic devices, such as printed wiring boards and integrated circuits. Suitable applications include, but are not limited to, waveguides for printed wiring boards, optical interconnects, gratings, optical switches, optical amplifiers, and the like. The present invention is also suitable for use as lenses particularly by using special graded index profiles that are photoimageable, antireflective coatings for lenses, and the like.

The present invention also provides a method of manufacturing an electronic device, such as a printed wiring board or integrated circuit or an optical interconnect, having a porous optical device wherein the porous optical device is prepared by a method including the steps of: a) combining a plurality of porogen particles and a B-staged optical material; b) at least partially curing the B-staged optical material; c) at least partially removing the plurality of porogen particles; and d) defining a path for transmitting light through the optical material. Electronic devices including one or more optical devices prepared according to the above method are also contemplated by this invention.

What is claimed is:

1. A method of preparing a porous optical device comprising the steps of: a) combining a plurality of porogen particles and a B-staged optical material; b) at least partially curing the B-staged optical material; c) at least partially removing the plurality of porogen particles to form an optical material having a region having a plurality of pores and a porosity of a greater than or equal to 10%; and d) defining a path for transmitting light through the optical material, wherein the optical device is chosen from waveguides, gratings, photonic band gap structures, antireflectant coatings, optical interconnects, optical switches, optical amplifiers and lenses.

2. The method of claim 1 wherein the porogen particles are cross-linked.

3. The method of claim 1 wherein the plurality of porogen particles has a mean particle size of $\leq 10$ nm.

4. The method of claim 1 wherein the plurality of porogen particles has a mean particle size of $\leq 5$ nm.

5. The method of claim 1 wherein the porous optical device has a porosity of $\geq 30\%$.

6. The method of claim 1 wherein the B-staged optical material comprises organic polymers or organic-inorganic polymers.

7. The method of claim 6 wherein the organic polymers are selected from the group consisting of poly(meth)acrylate polymers, bicyclobutenes, polycarbonates, polyarylene ethers, polyesters, epoxies, polyurethanes, polycyclicolefins, and polyimides.

8. The method of claim 6 wherein the organic polymers are substituted with fluorine, deuterium or both fluorine and deuterium.

9. The method of claim 6 wherein the organo-inorganic polymers comprise organo polysilica materials.

10. The method of claim 9 wherein the organo polysilica resins are hydrolyzates or partial condensates of one or more silanes of formulae (I) or (II):

$$R_a SiY_{4-a} \tag{I}$$

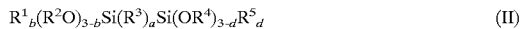

$$R^1{}_b(R^2O)_{3-b}Si(R^3)_a Si(OR^4)_{3-d} R^5{}_d \tag{II}$$

wherein R is hydrogen, $(C_1-C_{24})$alkyl, aryl, and substituted aryl; Y is any hydrolyzable group; a is an integer of 0 to 2; $R^1$, $R^2$, $R^4$ and $R^5$ are independently selected from hydrogen, $(C_1-C_{24})$alkyl, aryl, and substituted aryl; $R^3$ is selected from $(C_1-C_{18})$alkyl, $-(CH_2)_h-$, $-(CH_2)_{h1}-E_h-(CH_2)_{h2}-$, $-(CH_2)_h-Z$, arylene, substituted arylene, and arylene ether; E is selected from oxygen, $NR^6$ and Z; Z is selected from aryl and substituted aryl; $R^6$ is selected from hydrogen, $(C_1-C_8)$alkyl, aryl and substituted aryl; b and d are each an integer of 0 to 2; c is an integer of 0 to 6; and h, h1, h2 and k are independently an integer from 1 to 6; provided that at least one of R, $R^1$, $R^3$ and $R^5$ is not hydrogen.

11. The method of claim 1 wherein the porous optical device further comprises a non-porous region.

12. A method of manufacturing an electronic device comprising a porous optical device wherein the porous optical device is prepared according to the method of claim 1.

13. The method of claim 12 wherein the electronic device is selected from the group consisting of printed wiring boards, integrated circuits and optical interconnects.

14. A method of preparing a porous optical device comprising a core material and a cladding material, comprising steps of: a) combining a plurality of porogen particles and a B-staged optical material; b) at least partially curing the B-staged optical material to form an optical matrix material; c) at least partially removing the plurality of porogen particles to form a porous optical matrix material; and d) defining a path for transmitting light through the porous optical device, wherein the core material, the cladding material or both the core material and the cladding material comprise the porous optical matrix material.

15. The method of claim 14, wherein the porous optical device is a waveguide, wherein the waveguide has a bend radius of $\geq 1$ $\mu$m.

16. The method of claim 15, wherein the waveguide has a bend radius of $\geq 10$ $\mu$m.

17. The method of claim 16, wherein the waveguide is formed as part of a printed wiring board.

18. The method of claim 15, wherein the waveguide is formed as part of a printed wiring board.

19. The method of claim 14 wherein the plurality of porogen particles has a mean particle size of $\geq 10$ nm.

* * * * *